United States Patent
Sciandra et al.

(10) Patent No.: US 6,327,380 B1
(45) Date of Patent: *Dec. 4, 2001

(54) METHOD FOR THE CORRELATION OF THREE DIMENSIONAL MEASUREMENTS OBTAINED BY IMAGE CAPTURING UNITS AND SYSTEM FOR CARRYING OUT SAID METHOD

(75) Inventors: Jacques Sciandra; Michel Divet; Guy Rolet, all of Lyons (FR)

(73) Assignee: Orten S.A., Lyons (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,075
(22) PCT Filed: Sep. 14, 1995
(86) PCT No.: PCT/FR95/01181
   § 371 Date: Jun. 25, 1998
   § 102(e) Date: Jun. 25, 1998
(87) PCT Pub. No.: WO96/08691
   PCT Pub. Date: Mar. 21, 1996

(30) Foreign Application Priority Data

Sep. 16, 1994 (FR) .................................................. 94/11462

(51) Int. Cl.$^7$ ........................................................ G06K 9/00
(52) U.S. Cl. ............................................................ 382/154
(58) Field of Search ........................... 382/154; 345/139, 345/418; 348/142; 356/12, 13, 14, 373, 374, 385; 702/145, 146, 147, 148, 149

(56) References Cited

U.S. PATENT DOCUMENTS 5,446,798 * 8/1995 Morita et al. ........................ 382/154

FOREIGN PATENT DOCUMENTS 4-259809 * 9/1992 (JP) .

OTHER PUBLICATIONS

Paul K. Commean et al., "Geometric design of multisensor structured light range digitizer", Optical Engineering, vol. 33 No. 4, pp 1349–1358, Apr., 1994.*

Keith D. Gremban et al., "Geometric Camera Calibration Using Systems of Linear Equations", Proceedings IEEE of Int. Conference on Robotics & Automation on Philadelphia USA, P562–567, 1988.*

* cited by examiner

*Primary Examiner*—Samir Ahmed
(74) *Attorney, Agent, or Firm*—Dowell & Dowell, P.C.

(57) ABSTRACT

Method for the correlation of three dimensional measurements obtained by at least one first (1) and one second (2) image capturing unit. The method comprises, for the calibration phase, the steps of: producing a calibrating ball (4) movably and rotatably mounted about an axis (7), successively and rotatingly shifting the calibrating ball (4) into the measuring positions which are visible to the acquisition units; measuring, for each of the measuring positions, the spherical cap seen by each of the image capturing units; determining, for each of the measuring positions, the center of the calibrating ball, to express the same reference frame in the first and second reference marks viewed by the first and second image capturing units respectively; calculating the matrix of the passage from the first reference mark to the second reference mark to correlate the measurements between the first and second optical image capturing units.

14 Claims, 4 Drawing Sheets

METHOD FOR THE CORRELATION OF THREE DIMENSIONAL MEASUREMENTS OBTAINED BY IMAGE CAPTURING UNITS AND SYSTEM FOR CARRYING OUT SAID METHOD

TECHNICAL FIELD

The present invention concerns the technical field of the three-dimensional measurement of objects in the general sense, performed with the aid of optical image-acquisition systems, and it relates more particularly to the measurement methods relying on the technique of fringe projection and analysis of the deformation of the fringes on the object.

The invention finds a particularly advantageous application in the field of measuring the parts of the human body, with a view to obtaining partial or full reproduction of the parts of the body which are measured.

In an application which is preferred, but not exclusive, the subject of the invention aims to measure, in three dimensions, the torso of an individual in order to perform the automated manufacture of orthopedic corsets.

PRIOR ART

In the field of measurement with the aid of image-acquisition systems, such as cameras, the situation often occurs, in numerous applications, that the angle of view of a camera is insufficient to cover the surface of the object to be acquired. In order to solve this problem, various pictures are taken and the images are correlated with one another.

A first technique for correlating images is proposed by patent application FR 88-15 483. This technique consists in fixing a marker on the object and, when taking the pictures, in displacing the camera relative to the object. In practice, placing a marker on the object proves to be an operation which is difficult to achieve, in particular when the object constitutes a part of an individual. It should be noted that errors may be made in the measurements, in particular in this type of application, because of the movement of the individuals when the pictures are being taken. In addition, the very principle of this method demands that the marker be constantly visible by the camera, which limits the field of view for taking pictures. This technique thus makes it impossible, in particular, to reconstruct a complete volume encompassing 360°.

In order to overcome the drawback of positioning a marker on the object, another technique for correlating images has been proposed, consisting in the use of a plurality of cameras whose positions, relative to one another, are known and predetermined. This method makes it necessary to take dimensional readings which prove to be time-consuming, difficult and tedious to achieve. In addition, the supports for the cameras must have a high degree of robustness and rigidity in order to keep the measurements accurate.

The object of the invention therefore aims to overcome the drawbacks of known techniques, by providing a method for correlating three-dimensional measurements given by at least two optical image-acquisition systems, affording the advantage of not having to employ markers on the object and not requiring dimensional readings to be made between said systems.

SUMMARY OF THE INVENTION

In order to achieve this object, the correlation method according to the invention consists, for the calibration phase:

in producing a standard sphere, mounted so as to move in rotation about an axis different than that passing through the center of the sphere;

in displacing the standard sphere by successive rotations in order to place it in at least first and second measurement positions which are visible simultaneously by the two optical image-acquisition systems;

in displacing the standard sphere by rotation in order to place it in at least one measurement position, which is visible by at least the first optical image-acquisition system and is different than the first and second measurement positions;

in displacing the standard sphere by rotation in order to place it in at least one measurement position, which is visible by at least the second optical image-acquisition system and is different than the first and second measurement positions;

in measuring, for each of the measurement positions, the cap of the standard sphere seen by each of the optical image-acquisition systems;

in determining, for each of the measurement positions, the center of the cap of the standard sphere seen by each of the optical image-acquisition systems, in order to make it possible to express the same reference system in a first coordinate frame seen by the first optical image-acquisition system, and in a second coordinate frame seen by the second optical image-acquisition system;

and in calculating the matrix of the transformation between the first and second coordinate frames, in order to make a correlation between the measurements of the first and second optical image-acquisition systems.

A method of this type thus makes it possible to calibrate at least two optical image-acquisition systems, making it possible to link, in a unique coordinate frame, the various surfaces measured by said systems.

Another object of the invention aims to improve the reconstruction of the surfaces which are observed, by eliminating the effects of shadows cast by the reliefs on the object, due to the illumination orientation.

In order to achieve this objective, the method according to the invention consists:

for at least one optical image-acquisition system, in using two sensors, each formed by a camera and a fringe projector;

and in making a correlation between the two sensors by using a plane delimiting a physical reference common to the two sensors.

Various other characteristics will emerge from the description, given below with reference to the appended drawings which show, by way of nonlimiting examples, embodiments and ways of implementing the subject of the invention.

PREFERRED EMBODIMENT OF THE INVENTION

Figure 1:
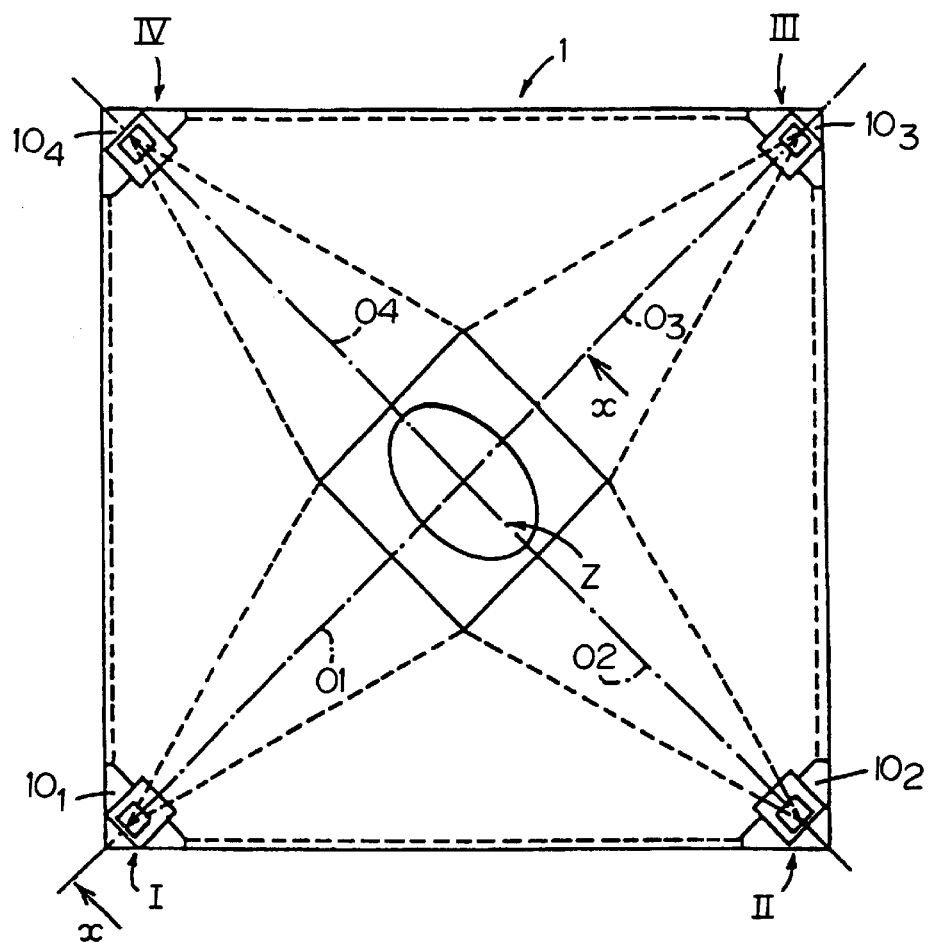
FIG. 1 is a view in section from above, illustrating an installation for implementing the method according to the invention.

As shown in FIG. 1, the installation 1 is designed for the three-dimensional measurement of an object in the general sense, and in particular the torso of an individual, with the aid of at least a first I and a second II optical image-acquisition system. It should be understood that each optical image-acquisition system has the function of delivering a set of points representing the object, controlled dimensionally in a three-dimensional coordinate frame linked with the optical image-acquisition system. For the sake of simplicity and clarity, an optical image-acquisition system is referred to in the rest of the description as an acquisition system. In the example which is illustrated, the installation includes four acquisition systems I to IV with a 90° offset between each pair, so as to measure the object over its entire periphery. Each acquisition system I to IV measures a different portion of the object which is placed inside a zone Z delimited in the vicinity of the intersection of the optical axes $O_1$ to $O_4$ of the acquisition systems I to IV. The acquisition systems I to IV are connected to a control and processing unit (not represented) which is designed to control and acquire the measurements and match the images to one another in order to reconstruct the object.

The object of the invention aims to provide a method for calibration between the various acquisition systems I to IV, so as to link together each of the surfaces seen by an acquisition system. In order to make the method according to the invention easier to understand, the following description describes the matching of the first I and second II acquisition systems. Of course, the method is realized by repeating the various steps for each pair of neighboring acquisition systems.

Figure 2:
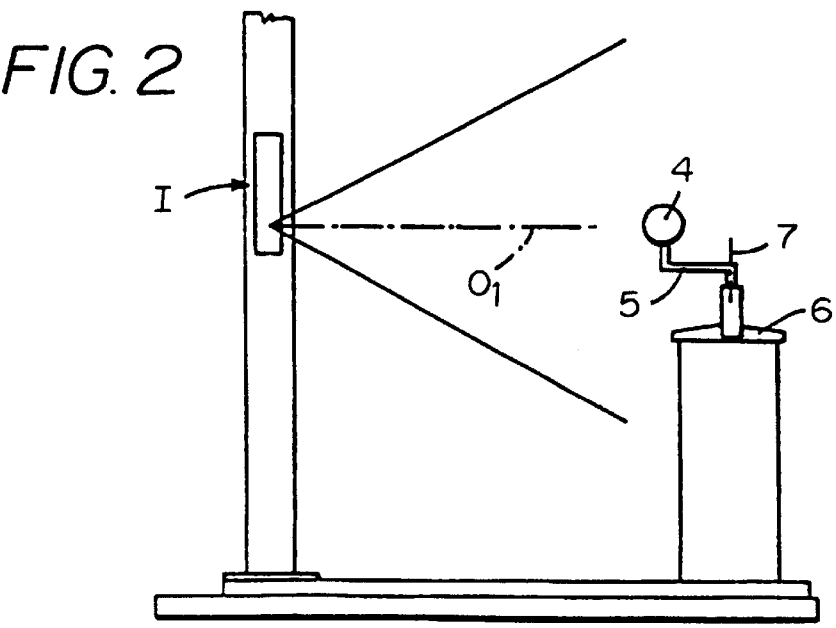
FIG. 2 is a view in section/elevation taken substantially along the lines x—x in FIG. 1.
Figure 3A:
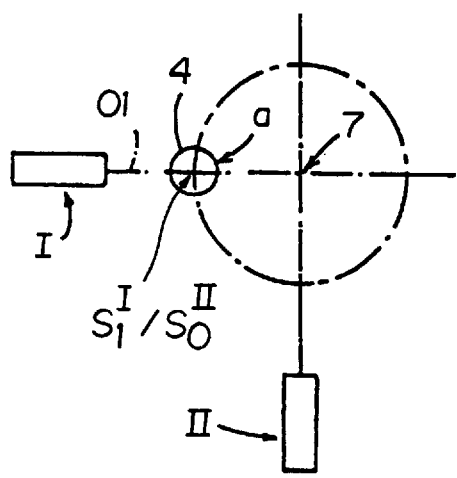
FIGS. 3A to 3D are schematic diagrams illustrating the characteristics phases of the method according to the invention.

In order to calibrate the acquisition systems, the method consists, as illustrated in FIG. 2, in using a standard sphere 4 carried by an arm 5 which is mounted so that it can move on a support 6, about an axis of rotation 7 which is different than that passing through the center of the standard sphere 4. As more precisely emerges from FIG. 3A, the standard sphere 4 is placed in a first position a in which it is visible simultaneously by the acquisition systems I and II. For the sake of simplicity, the standard sphere 4 is placed, at position a, so as to be substantially centered on the optical axis $O_1$ of the first acquisition system I. Each acquisition system I, II then measures the visible spherical cap of the sphere 4. The method then consists in determining, using conventional computation techniques, the centers $S^I_1$ and $S^{II}_0$ of the standard sphere seen respectively by the acquisition systems I and II.

Figure 3B:
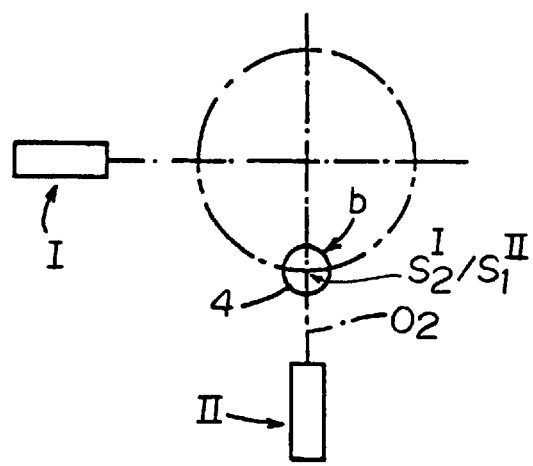

The method according to the invention consists in placing, by a rotation about the axis 7, the standard sphere 4 in a second measurement position b in which it is visible simultaneously by the two acquisition systems I, II (FIG. 3B). For the sake of simplicity, the standard sphere 4 is, in position b, centered substantially on the optical axis $O_2$ of the acquisition system II. In position b, the acquisition systems I and II measure the visible spherical cap of the standard sphere 4. The method consists in then determining the centers $S^I_2$, $S^{II}_1$ of the standard sphere seen respectively by the acquisition systems I and II.

Figure 3C:
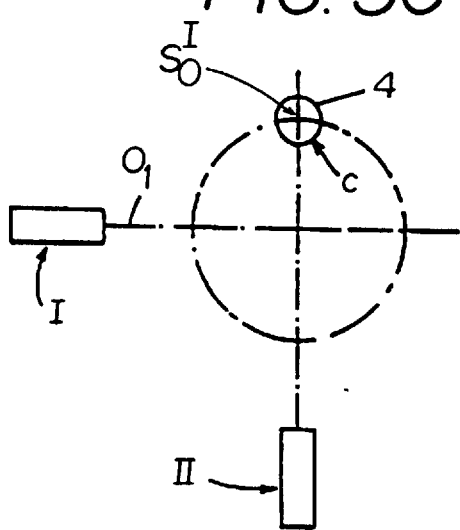

The method according to the invention also consists in displacing, by rotation about the axis 7, the standard sphere 4 in order to place it in a third position c, which is visible at least by the first acquisition system I and is different than the positions a and b. In the example illustrated in FIG. 3C, the position c is symmetrical to the position b with respect to the optical axis $O_1$ of the first acquisition system I. The spherical cap visible by the acquisition system I is measured, and the center $S^I_0$ of the standard sphere 4 seen by the acquisition system I is calculated.

Figure 3D:
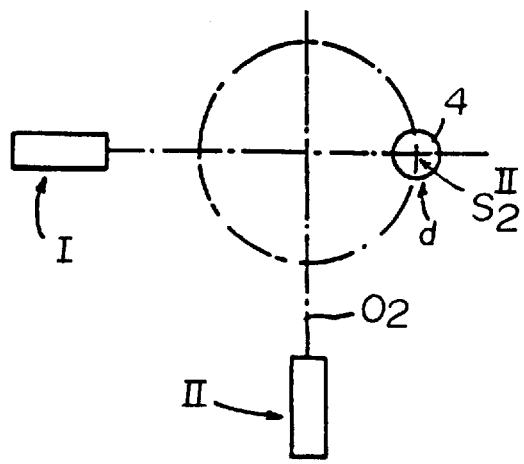

As emerges from FIG. 3D, the standard sphere 4 is placed in a position d in which the sphere is visible at least by the second acquisition system II and which is different than the positions a and b. In the example which is illustrated, the positioning of the sphere 4 at position d corresponds to a position which is substantially symmetrical to the position a with respect to the optical axis $O_2$ of the acquisition system II. The spherical cap of the standard sphere 4, seen by the second acquisition system II, is then measured. The method consists in then determining the center $S^{II}_2$ of the standard sphere seen by the acquisition system II. As emerges from the description above, each acquisition system I, II has made it possible to determine three points, respectively $S^I_0$, $S^I_1$, $S^I_2$ and $S^{II}_0$, $S^{II}_1$, $S^{II}_2$ which are situated on the same circle in space and in the same plane because of the displacement of the sphere 4 about a fixed off-center axis 7, by successive rotations.

The method consists in calculating, by an appropriate method known per se, the center $A^I$ of the circle passing through the points $S^I_0$, $S^I_1$, $S^I_2$. The point $A^I$ is defined as being the intersection of the axis of rotation 7 of the sphere 4 and of the plane described by the center of the sphere.

On the basis of the points above, a coordinate frame $R_I$ ($A^I$, $\vec{U}^I$, $\vec{V}^I$, $\vec{W}^I$) can be determined which is composed of an origin point $A^I$ embodying the center of the coordinate frame and of a basis $B^I$ formed by three unit vectors $\vec{U}^I$, $\vec{V}^I$, $\vec{W}^I$ such that: $\vec{U}^I = \overrightarrow{A^I S^{I_1}}$ $\vec{V}^I = \overrightarrow{A^I S^{I_2}}$ and $\vec{W}^I = \vec{U}^I \wedge \vec{V}^I$.

Similarly, the center $A^{II}$ of the circle passing through the points $S^{II}_0$, $S^{II}_1$, $S^{II}_2$ can be calculated. A coordinate frame $R_{II}$ ($A^{II}$, $\vec{U}^{II}$, $\vec{V}^{II}$, $\vec{W}^{II}$) is then determined, composed of an origin point $A^{II}$ and a basis $B^{II}$ formed by three unit vectors $\vec{U}^{II}$, $\vec{V}^{II}$, $\vec{W}^{II}$, such that: $\vec{U}^{II} = \overrightarrow{A^{II} S^{II_1}}$ $\vec{V}^{II} = \overrightarrow{A^{II} S^{II_2}}$ and $\vec{W}^{II} = \vec{U}^{II} \wedge \vec{V}^{II}$.

Knowledge of a reference system embodied by the various positions of the standard sphere, and expressed in two different coordinate frames $R_I$, $R_{II}$, makes it possible to calculate mathematically the matrix of the transformation from the first coordinate frame to the second coordinate frame, and thus to express any point measured in the first coordinate frame to the second, and vice versa. This transformation matrix makes it possible to express, in a unique coordinate frame, the measurements of an object which are taken by the acquisition systems I, II.

As emerges from the description above, the method according to the invention includes a phase of calibrating the acquisition systems which, once performed, allows the objects to be measured in relief, without needing to place markers on the object. The only constraint relates to the fact that the object to be measured is placed in the zone Z delimited by the fields of view of the acquisition systems. Moreover, a calibration method of this type, which allows accurate knowledge of the relative positions of the acquisition systems, does not make it necessary to take the dimensional readings, which are always difficult to perform.

Of course, the calibration method may be extended to an arbitrary number of pairs of acquisition systems. This calibration method also has the advantage that it is relatively easy to determine a physical point on the basis of a given surface, insofar as use is made of a standard sphere whose visible surface, irrespective of the angle at which the acquisition system views it, is always a spherical cap associated with a single point in space, namely its center. The method according to the invention also has the advantage of avoiding the determination of a standard object, insofar as all the points required for the calibration can be available simultaneously. In addition, this method does not require accurate knowledge of the position of the points necessary for the calibration.

In practice, the calibration method according to the invention is relatively easy to achieve. For a correlation of the acquisition systems I, II, the following procedure may be envisaged:

placing the sphere 4 in the position c, acquiring the measurements with the first acquisition system I, and determining the center $S'_0$ of the sphere with respect to the first acquisition system I, rotating the sphere 4 by one quarter turn in a given sense, for example counterclockwise, to place it in position a, acquiring the measurements with the first and second acquisition systems I, II, and determining the centers $S'_1$, $S''_0$ seen respectively by the acquisition systems I, II, rotating the sphere 4 by one quarter turn in the counterclockwise sense to place it in position b, acquiring the measurements with the first and second acquisition systems I, II and determining the centers $S'_2$, $S''_1$ seen respectively by the acquisition systems I, II, rotating the sphere 4 by one quarter turn in the counterclockwise sense to place it in position d, acquiring the measurements with the second acquisition system II and determining the center $S''_2$ seen by the second acquisition system II.

In the preceding example, provision was made to choose two different measurement positions c and d which are each visible only by one of the acquisition systems. It may, of course, be envisaged, for the measurement position c visible by at least the first acquisition system, and for the measurement position d visible by at least the second acquisition system, to choose a unique measurement position visible simultaneously by the two acquisition systems. In this hypothetical case, in order to carry out the correlation phase, it is sufficient to place the standard sphere 4 in a third position, taken between the positions a and b.

Figure 4:
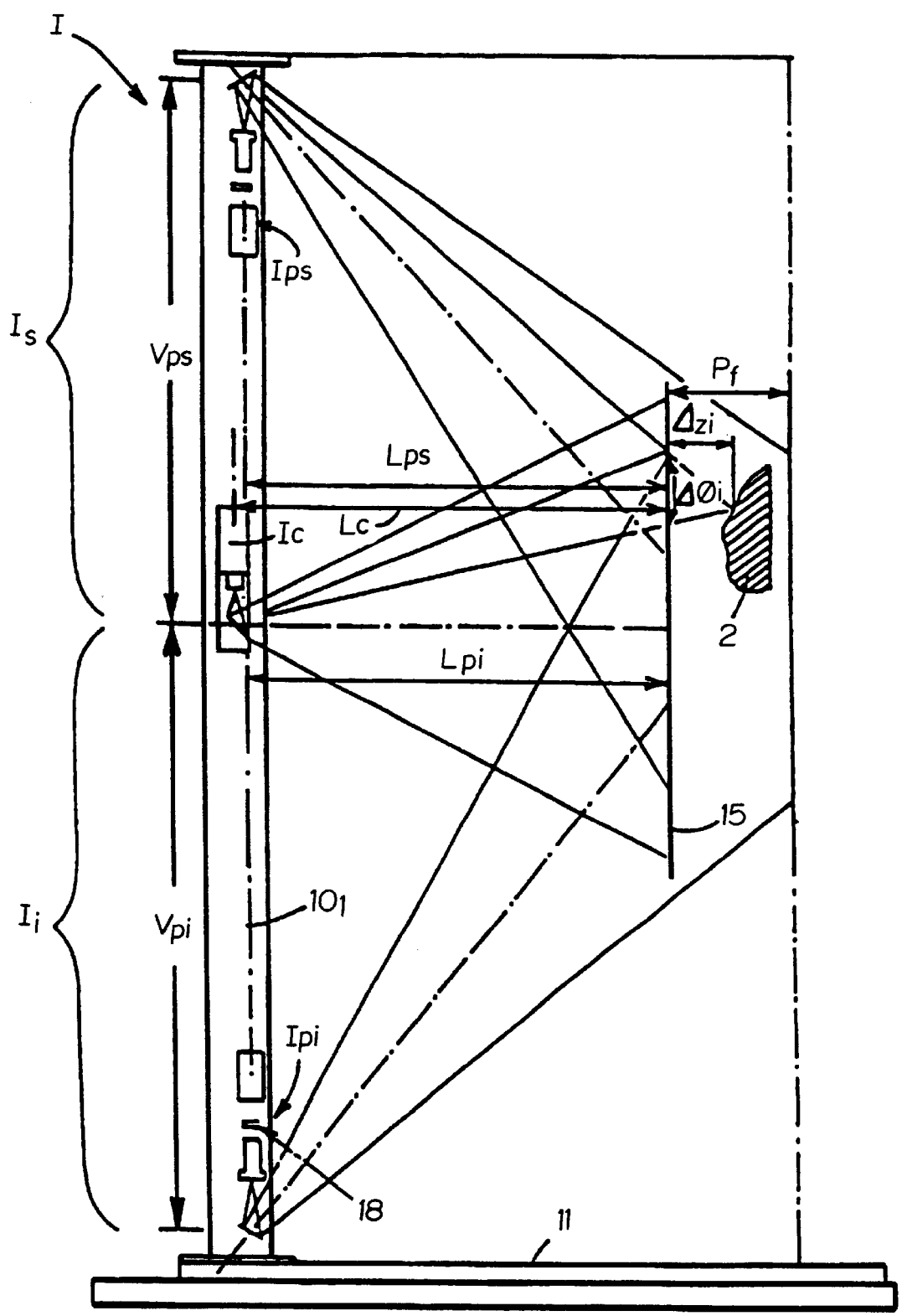
FIG. 4 is a view in elevation, similar to FIG. 2, showing an installation which makes it possible to implement a particular characteristic of the method according to the invention.

It should be considered that each acquisition system I to IV may consist of a sensor whose images are correlated with those of the neighboring camera. In one embodiment which is preferred, but not exclusive, at least one and, for example, each acquisition system I to IV is formed, respectively, by two sensors Is–Ii to IVs–IVi which are each composed of a camera and a projector which generates fringes originating from an appropriate test pattern and is referred to in the rest of the description as a fringe projector. In a preferred illustrative embodiment, provision is made to use a common camera for the two sensors of the same acquisition system. Thus, as emerges more precisely from FIG. 4, each sensor Is to IVs is composed of a camera Ic to IVc and a so-called upper fringe projector Ips to IVps, while each sensor Ii to IVi is composed of a camera Ic to IVc and a so-called lower fringe projector Ipi to IVpi. As emerges clearly from FIG. 4, the projectors Ips and Ipi of the acquisition system I are fixed on an upright or a column $10_1$ while being arranged in a plane substantially symmetrically with respect to the camera Ic, which is also fixed on the support $10_1$. Each projector Ips, Ipi is distant from the camera Ic by a given measure, respectively Vps, Vpi. The acquisition systems II to IV are formed in the same way as the acquisition system I and are each mounted, respectively, on an upright $10_2$ to $10_4$. The installation 1 thus includes four columns $10_1$ to $10_4$, joined to one another by top and bottom cross pieces, and a base 11 on which the object 2 to be measured is intended to be arranged. The measuring installation 1 is in the form of a rigid unitary structure composed of four columns $10_1$ to $10_4$ which each rigidly support an acquisition system I to IV and are firmly secured together.

It should be considered that each camera/projector pair Is to IVs, and Ii to IVi constitutes an autonomous sensor which has its own calibration and its own mathematical reference basis, in which the measurements are expressed. These mathematical bases are determined, for each camera/projector pair, by the technique of two parallel planes, which is known per se and described, in particular, in the publication by Gremban K. D., Thorpe C. E., Kanade T., *Geometric Camera Calibration Using System of Linear Equation*, Proceedings IEEE of Int. Conference on Robotics and Automation, Philadephia, pp 947–951, (1988) [sic]. This calibration technique consists in placing a panel 15, which delimits a reference plane, at a distance Lc from one camera Ic to IVc and at distances Lps and Lpi, respectively, from the projectors Ips to IVps and Ipi to IVpi. In order to match the two bases of the sensors belonging to the same acquisition system, a common physical coordinate frame, identifiable by the two camera/projector pairs, is defined conventionally by:

an origin point, defined as being the intersection of the optical axis of the camera and the reference plane, a vector $\vec{Z}$, parallel to the optical axis and directed toward the camera, two orthogonal vectors $\vec{X}$ and $\vec{Y}$, which are located in the reference plane and are parallel to the rows and columns of photosensitive cells of the camera, the vectors $\vec{X}, \vec{Y}, \vec{Z}$ forming a positively oriented basis.

In order to allow precise coordination of two bases which together form each acquisition system I–IV, the reference planes, one of which is associated with the calibration of the pair Ii–IVi, and the other of which is associated with the calibration of the pair Is–IVs, should either coincide or be parallel and off-set by an accurately known distance.

In order to simplify the geometrical model, the axis of the objective of the camera is placed perpendicular with respect to the reference plane.

The method consists, for the acquisition system I, in acquiring firstly the image which is formed on the panel 15 and consists of the fringes projected by one of the projectors, for example the projector Ips, and in acquiring the image which is formed on the panel and consists of the fringes projected by the other of the projectors, for example the projector Ipi. The method then consists in shifting the panel by a measure Pf with respect to the reference plane. The method consists in next acquiring the image which is formed on the panel 15 and consists of the fringes projected by one of the projectors, for example Ips, and in then acquiring the image which is formed on the panel 15 and consists of the fringes projected by the other of the projectors, namely Ipi. The operations described above are repeated for the acquisition systems II to IV.

It should be noted that the camera is focused so that the sharp plane closest to the camera is the reference plane, the depth of field being the measure Pf. Similarly, the objectives of the projectors are focused so that the sharp plane closest to the camera is the reference plane, the depth of field being the measure Pf. The distance Lc between the camera and the reference plane, as well as the distance Pf between the reference plane and the shifted plane, are measured accurately. In addition, the fringes projected onto the reference plane are parallel to the rows of photo-sensitive cells in the camera.

In addition, the measures Lpi, Lps, Vpi, Vps are extracted by the method of the two planes which are mentioned above [sic]. The determination of the parameters Lp, Vp, Lc and the knowledge of the parameters Pccd defining the pitches of the pixels of the camera make it possible to calibrate each sensor. In fact, the altitude ΔZi of any point Mi in space, with respect to the reference plane, can be modeled by a function F of the type:

$$\Delta Z_i = F_{Lc, Lp, Vp, Pccd}(\Delta\Phi i).$$

The quantity ΔZi is the altitude of the point Mi of the object 2 which is measured, that is to say the perpendicular distance from the point Mi to the reference plane. The quantity ΔΦ i is the shift, seen by the camera, of the fringe in contact with the point Mi. This shift is defined in the reference plane, with respect to the position of the same fringe on the reference plane. Each fringe projected onto the reference plane is phase-shifted by ΔΦ i on the digitized image, when it reaches the shifted plane. To each phase shift ΔΦ i there corresponds an altitude ΔZi which is constant, irrespective of the ray i in question, since the shifted plane is parallel to the reference plane. On the basis of a large set of pairs (ΔΦ i, ΔZi), the parameters Lp, Vp can be optimized by an appropriate computation method, applied to the function F.

The use of two sensors for each acquisition system makes it possible to improve the reconstruction of the surfaces which are observed and to eliminate the effects of shadows cast by the reliefs due to the illumination orientation. The use of a common camera for two sensors makes it possible to simplify the physical coordination of the coordinate frames of the two sensors.

Figure 5A:
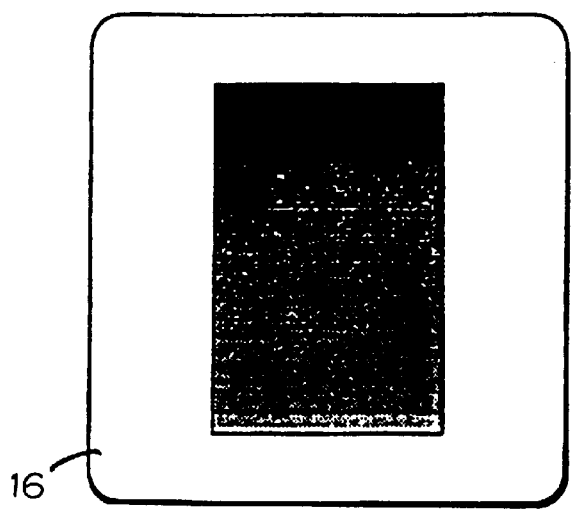
FIGS. 5A to 5C are views of test patterns which each have particular characteristics of transmission and/or pitch variation and are fitted to the fringe projectors employed in the context of the invention.
Figure 5B:
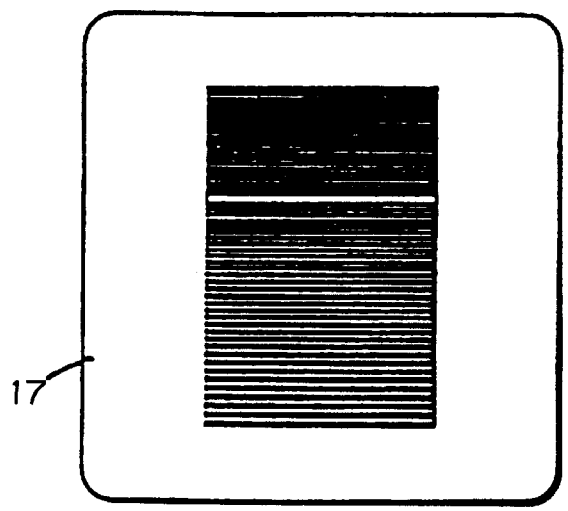
Figure 5C:
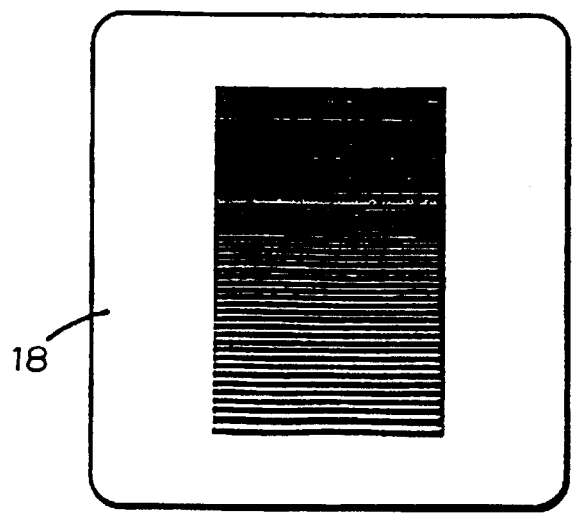

In the example which is described above, it should be noted that the fringe projectors Ips to IVps and Ipi to IVpi are inclined with respect to the normal to the reference plane. The result of this is that the light illumination varies considerably from one point to another in the reference plane. Thus, in order to balance the variation in illumination on the object, due to the significant inclination of the projectors, provision is made, as illustrated in FIG. 5A, to produce a test pattern 16 whose transmission varies according to a law which is appropriate to the geometrical situation. Similarly, the inclination of the fringe projector causes a variation in the apparent pitch of the test pattern. In order to compensate for the variation in the projected pitch, provision is made, as illustrated in FIG. 5B, to produce a test pattern 17 whose pitch follows a law which is appropriate to the geometrical situation. This arrangement makes it possible to balance the resolution of the sensor in the transverse field. According to a preferred embodiment, each fringe projector is equipped with a single test pattern 18 (FIGS. 4 and 5C) combining the characteristics of the test patterns 16, 17, that is to say having a variable pitch and a variable optical transmission.

POSSIBILITY OF INDUSTRIAL APPLICATION

The subject of the invention finds an application in the field of the optical measurement of objects in the general sense, with a view to reconstructing them. One particularly advantageous application of the invention relates to measuring the parts of the human body.

What is claimed is:

1. A method for correlating three-dimensional measurements taken by at least a first (I) and a second (II) optical image-acquisition system, the method including a calibration phase comprising the steps of:

providing a reference system including a sphere mounted so as to move in rotation in a plane about a first axis spaced from and different than a second axis passing through a center of the sphere;

placing the at least first and second optical image-acquisition system in an arcuate relationship spaced from one another along a circle which is perpendicular to said first axis and which circle has a center aligned with said first axis;

displacing the sphere by successive partial rotations in the plane about the first axis in order to place the sphere in at least first (a) and second (b) measurement positions which are visible simultaneously by the two optical image-acquisition systems;

displacing the sphere by partial rotation in the plane about the first axis in order to place it in at least one measurement position (c), which is visible by at least the first optical image-acquisition system (I) and is different than the first and second measurement positions;

displacing the sphere by rotation in the plane about the first axis in order to place it in at least one measurement position (d), which is visible by at least the second optical image-acquisition system (II) and is different than the first and second measurement positions;

measuring, for each of the measurement positions, a surface of the sphere seen by each of the optical image-acquisition systems;

determining, for each of the measurement positions, the center of the sphere seen by each of the optical image-acquisition systems; determining and expressing the reference system in a first coordinate frame as seen by the first optical image-acquisition system, and determining and expressing in a second coordinate frame the reference system as seen by the second optical image-acquisition system; and calculating a matrix of the transformation between the first and second coordinate frames, in order to make a correlation between the measurements of the first and second optical image-acquisition systems.

2. Method according to claim 1, characterized in that for the measurement position (c) visible by at least the first optical image-acquisition system, and for the measurement position (d) visible by at least the second optical image-acquisition system, a unique measurement position is chosen which is visible simultaneously by the at least one first and second optical image-acquisition systems.

3. Method according to claim 1, characterized in that for the measurement position (c) visible by at least the first optical image-acquisition system, and for the measurement position (d) visible by at least the second optical image-acquisition system, two different measurement positions are chosen, each visible by one of the at least first and second optical image-acquisition systems.

4. Method according to claim 3, characterized in that for the two different measurement positions, each visible by one of the at least one first and second optical image-acquisition systems, in placing the sphere in a position which is substantially symmetrical, with respect to the optical axis of the system, to the position of the sphere and are visible by the at least one first and second optical image-acquisition systems.

5. Method according to claim 1, characterized in that for the first (a) and second (b) measurement positions which are visible simultaneously by the at least one first and second optical image-acquisition systems, placing the sphere substantially in the optical axis, respectively, of the first (I) and second (II) optical image-acquisition systems.

6. Method according to claim 1 including a plurality of optical image-acquisition systems, characterized in that:

for at least one of the plurality of optical image-acquisition systems, using two sensors each formed by a camera and a fringe projector;

and making a correlation between the two sensors by using a plane delimiting a physical reference common to the two sensors.

7. Method according to claim 6, characterized by using a common camera for the two sensors.

8. Method according to claim 6, characterized in that for making the correlation between the two sensors by using a plane delimiting a physical reference common to the two sensors, the steps of:

placing a panel, delimiting a reference plane, at a distance (Lc) from the camera and at distance (Lpi, Lps) from the projectors, acquiring an image which is formed on the panel and which consists of the fringes projected by one of the projectors, acquiring the image which is formed on the panel and consists of the fringes projected by the other of the projectors, shifting the panel by a measure (Pf) with respect to the reference plane, acquiring the image which is formed on the panel and consists of the fringes projected by one of the projectors, acquiring the image which is formed on the panel and consists of the fringes projected by the other of the projectors, and determining the distances separating the reference plane from the camera and from the projectors, so as to make it possible to make the correlation between the two sensors.

9. Method according to claim 6, including equipping each fringe projector with a test patten whose transmission varies according to a law which is appropriate to the geometrical situation, to thereby balance a variation in illumination due to an inclination of each projector with respect to a surface onto which the fringes are projected.

10. Method according to claim 6, including equipping each fringe projector with a test pattern having a pitch which follows a law which is appropriate to the geometrical situation, in order to compensate for a variation in projected pitch.

11. Method according to claim 6, including equipping each fringe projector with a test pattern of variable pitch and with variable optical transmission.

12. A system for correlating three-dimensional measurements taken by at least a first (I) and a second (II) optical image-acquisition system, which are connected together by a control and processing unit, characterized in that it includes, in order to perform the method of claim 1, a sphere carried by an arm mounted to rotate on a support, about an axis of rotation different than an axis passing through the center of the sphere.

13. The system of claim 12, characterized in that it comprises, for each optical image-acquisition system, a camera on either side of which two fringe projectors are mounted, substantially symmetrically and on a support forming a column.

14. The system of claim 13, characterized in that the supports of the optical image-acquisition systems are secured together to form a rigid measurement structure.

* * * * *